United States Patent
Yuan

(10) Patent No.: US 12,422,084 B1
(45) Date of Patent: Sep. 23, 2025

(54) PIPELINE DETECTOR

(71) Applicant: Shenzhen Maotewang Electronic Technology Co Ltd., Shenzhen (CN)

(72) Inventor: Huashan Yuan, Yiyang (CN)

(73) Assignee: SHENZHEN MAOTEWANG ELECTRONIC TECHNOLOGY CO LTD., Shenzhen (CN)

(*) Notice: Subject to any disclaimer, the term of this patent is extended or adjusted under 35 U.S.C. 154(b) by 0 days.

(21) Appl. No.: 19/082,475

(22) Filed: Mar. 18, 2025

(51) Int. Cl.
| | |
|---|---|
| *G01D 11/30* | (2006.01) |
| *F16L 55/40* | (2006.01) |
| *F17D 5/02* | (2006.01) |
| *G03B 17/08* | (2021.01) |
| *H01R 39/08* | (2006.01) |
| *H04N 23/50* | (2023.01) |
| *H04N 23/56* | (2023.01) |
| *H04N 23/57* | (2023.01) |
| *F16L 101/30* | (2006.01) |

(52) U.S. Cl.
CPC .............. *F16L 55/40* (2013.01); *G03B 17/08* (2013.01); *H01R 39/08* (2013.01); *H04N 23/555* (2023.01); *H04N 23/56* (2023.01); *H04N 23/57* (2023.01); *F16L 2101/30* (2013.01)

(58) Field of Classification Search
USPC ........................................................ 73/865.8
See application file for complete search history.

(56) References Cited

U.S. PATENT DOCUMENTS

| | | | | |
|---|---|---|---|---|
| 4,249,810 A | * | 2/1981 | O'Connor ............ | G03B 37/005 346/33 P |
| 6,862,945 B2 | * | 3/2005 | Chapman ............. | G01N 21/954 73/866.5 |
| 8,547,428 B1 | * | 10/2013 | Olsson ............... | G01N 21/8803 348/374 |
| 2005/0275725 A1 | * | 12/2005 | Olsson .................. | H04N 23/63 348/E5.026 |
| 2021/0265827 A1 | * | 8/2021 | Wells ..................... | H04N 23/50 |

FOREIGN PATENT DOCUMENTS

| | | |
|---|---|---|
| CN | 214799633 U | 11/2021 |
| CN | 217845121 U | 11/2022 |
| CN | 218378340 U | 1/2023 |
| CN | 109068093 B | 4/2024 |
| CN | 221121762 U | 6/2024 |

* cited by examiner

*Primary Examiner* — Walter L Lindsay, Jr.
*Assistant Examiner* — Warren K Fenwick

(57) ABSTRACT

Disclosed is a pipeline detector including a mounting rack, a host, and a wire coil enwound by a cable; one end of the cable is electrically connected to the host, and another end of the cable is connected with a camera assembly that includes a mounting shell, a mounting base rotatably disposed inside the mounting shell, a camera fixedly disposed on the mounting base, and a driving device driving the mounting base for rotation. The driving device includes a driving motor, a driving gear, and a driven gear; the cable is electrically connected to the camera; and a direction of optical axis of the camera is disposed in an inclined way relative to a direction of a rotation axis of the mounting base. According to the aforesaid technical solution, the camera can achieve all-round and dead zone-free detection in various complicated pipeline environments to improve detection accuracy and reliability.

20 Claims, 9 Drawing Sheets

PIPELINE DETECTOR

TECHNICAL FIELD

The present invention relates to the technical field of pipeline detection, and in particular to a pipeline detector.

TECHNICAL BACKGROUND

Pipeline detectors are widely applied to the fields such as municipal engineering, petrochemical engineering, and electric power for detecting the internal conditions of pipeline, e.g., pipe blocking, corrosion, crack, and other problems. With the development of pipeline detection technologies, there are increasingly higher requirements for the performance and function of detectors.

In related technologies, the existing pipeline detectors usually consist of several major parts. The core structure includes a rack functioning in supporting and fixing entire equipment; a case is mounted on the rack and accommodates control, signal processing, and other crucial components of a detector; and the rack is internally provided with a wire coil enwound by a climbing wire. One end of the climbing wire is electrically connected to the case for transmitting power and signal to a camera; and another end thereof is connected to the camera for the direct detection of the internal conditions of pipeline.

However, obvious defects have been exposed in the practical use of the existing pipeline detectors. Specifically, there exist serious limitations in the rotation angle of the camera. Due to the shortcomings in design, the camera cannot be adjusted in pipeline flexibly and multi-dimensionally. It is hard for the camera to acquire all-round fields of view in complicated pipeline environment, e.g., common elbows, branches, and diameter reducing parts. This results in a significant portion of the pipeline areas being left effectively unchecked, creating numerous dead zones in the detection process. These dead zones of detection make potential problems inside pipeline incapable of being found in time, thus affecting the safety assessment and maintenance decision for the entire pipeline system, thereby seriously reducing the accuracy and reliability of detection results.

To sum up, how to design an inventive pipeline detector that overcomes the limitations of the existing rotation angle by improving the rotational structure of a camera such that the camera can achieve all-round and dead zone-free detection in various complicated pipeline environments has become a crucial issue to be settled urgently in the technical field of current pipeline detection.

SUMMARY

The objective of the present application is to provide a pipeline detector that possesses the advantages of a large rotation angle of camera, and a wide range of detection.

The technical solution adopted in the present invention is as follows: a pipeline detector includes a mounting rack, a host fixedly disposed on the mounting rack, and a wire coil rotatably disposed inside the mounting rack; the wire coil is enwound by a cable; one end of the cable is electrically connected to the host, and another end of the cable is connected with a camera assembly;

the camera assembly includes a mounting shell, a mounting base rotatably disposed inside the mounting shell, a camera fixedly disposed on the mounting base, and a driving device for driving the mounting base for rotation; the driving device includes a driving motor fixedly disposed inside the mounting shell, a driving gear sleeved on an output shaft of the driving motor, and a driven gear that is fixedly disposed on one side of the mounting base deviating from the camera and is engaged with the driving gear; the cable is electrically connected to the camera; and a direction of optical axis of the camera is disposed in an inclined way relative to a direction of a rotation axis of the mounting base.

After adopting the aforesaid technical solution, the present invention has the following beneficial effects:

The present application provides a pipeline detector including a mounting rack, a host, a wire coil, and a cable enwound on the wire coil. One end of the cable is electrically connected to the host, and another end of the cable is connected with a camera assembly; the camera assembly includes a mounting shell, a mounting base rotatably disposed inside the mounting shell, a camera fixedly disposed on the mounting base, and a driving device for driving the mounting base for rotation. The driving device includes a driving motor fixedly disposed inside the mounting shell, a driving gear sleeved on an output shaft of the driving motor, and a driven gear that is fixedly disposed on one side of the mounting base deviating from the camera and is engaged with the driving gear; the cable is electrically connected to the camera; and a direction of optical axis of the camera is disposed in an inclined way relative to a direction of a rotation axis of the mounting base. The driving device is configured to drive the mounting base for rotation such that the camera can achieve all-round and dead zone-free detection in various complicated pipeline environments.

BRIEF DESCRIPTION OF THE DRAWINGS

To specify the embodiments of the present invention or the technical solutions in the prior art more clearly, the accompanying drawings required in the description of the embodiments or prior art will be introduced briefly. Obviously, the depicted accompanying drawings below merely show some embodiments of the present invention. Those skilled in the art could further obtain other drawings according to these accompanying drawings without any inventive effort.

Figure 1:
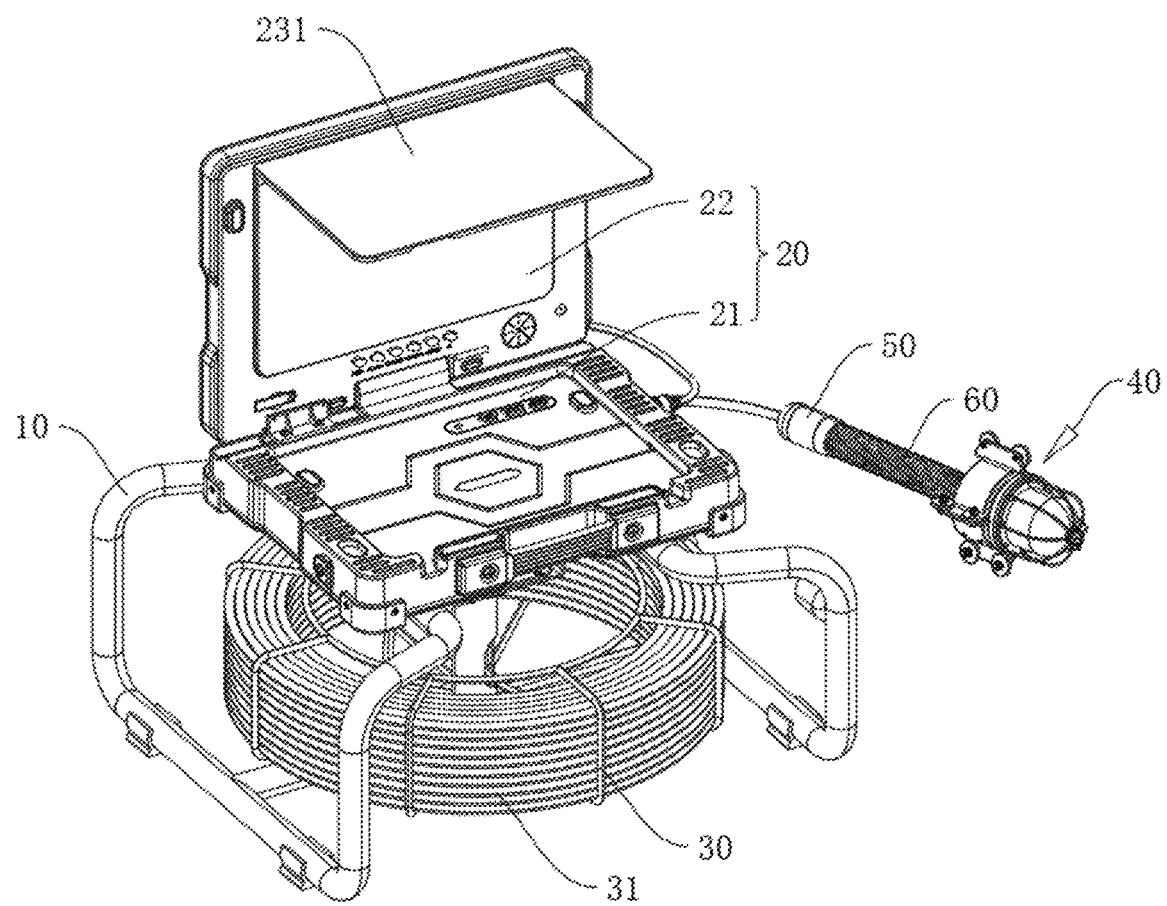
FIG. 1 is a schematic diagram showing an overall structure according to the present embodiment.

Description of reference numerals: 10-mounting rack; 20-host; 21-host body; 211-host bottom shell; 212-host face case; 213-main control circuit board; 214-battery; 215-battery holder; 216-first waterproof cotton strip; 217-battery cover; 218-second waterproof cotton strip; 22-display assembly; 221-display bottom shell; 222-display face shell; 223-display circuit board; 224-display screen; 225-front, back, left, and right rotating shafts; 226-third waterproof cotton strip; 227-waterproof EVA member; 228-silicone keypad; 229-keypad circuit board; 230-keypad waterproof pressing plate; 231-acrylic transparent board; 232-sun shield; 233-damping rotating shaft; 30-wire coil; 31-cable; 40-camera assembly; 41-mounting shell; 411-bottom mounting shell; 4111-roller; 4112-camera protective casing; 4113-ribbed plate; 4114-motor circuit board; 4115-position sensor; 4116-intercommunicating hole; 412-mounting face shell; 4121-bottom ring mounting groove; 413-waterproof seal ring; 42-mounting base; 43-camera; 44-driving device; 441-driving motor; 442-driving gear; 443-driven gear; 45-fixing base; 451-bearing base; 452-bearing; 46-camera shell; 461-camera bottom shell; 462-camera face shell; 463-shooting port; 47-lamp panel; 48-collision guardrail; 481-anti-collision bottom ring; 482-anti-collision face ring; 483-anti-collision rib strip; 484-quick release screw; 485-anti-loose silicone gasket; 50-connecting base; 51-tail cover; 52-middle connecting base; 53-lower connecting base; 54-upper connecting base; 541-coupling nut; 542-fixing nut; 55-first waterproof member; 551-first waterproof pressing plate; 552-first waterproof ring; 56-second waterproof member; 561-second waterproof pressing plate; 562-second waterproof ring; 57-third waterproof ring; 58-fourth waterproof ring; 60-spring; 601-anti-tension steel wire; 71-first electric connector; 711-five-core connecting plate; 712-ejector guide plate; 713-ejector plate; 72-five-core connecting wire; 73-second electric connector; 74-third electric connector; 741-conductive slip ring; 742-sliding sleeve; 80-waterproof meter counter; 81-waterproof aviation plug; and 82-signal wire.

DETAILED DESCRIPTION OF EMBODIMENTS

Figure 2:
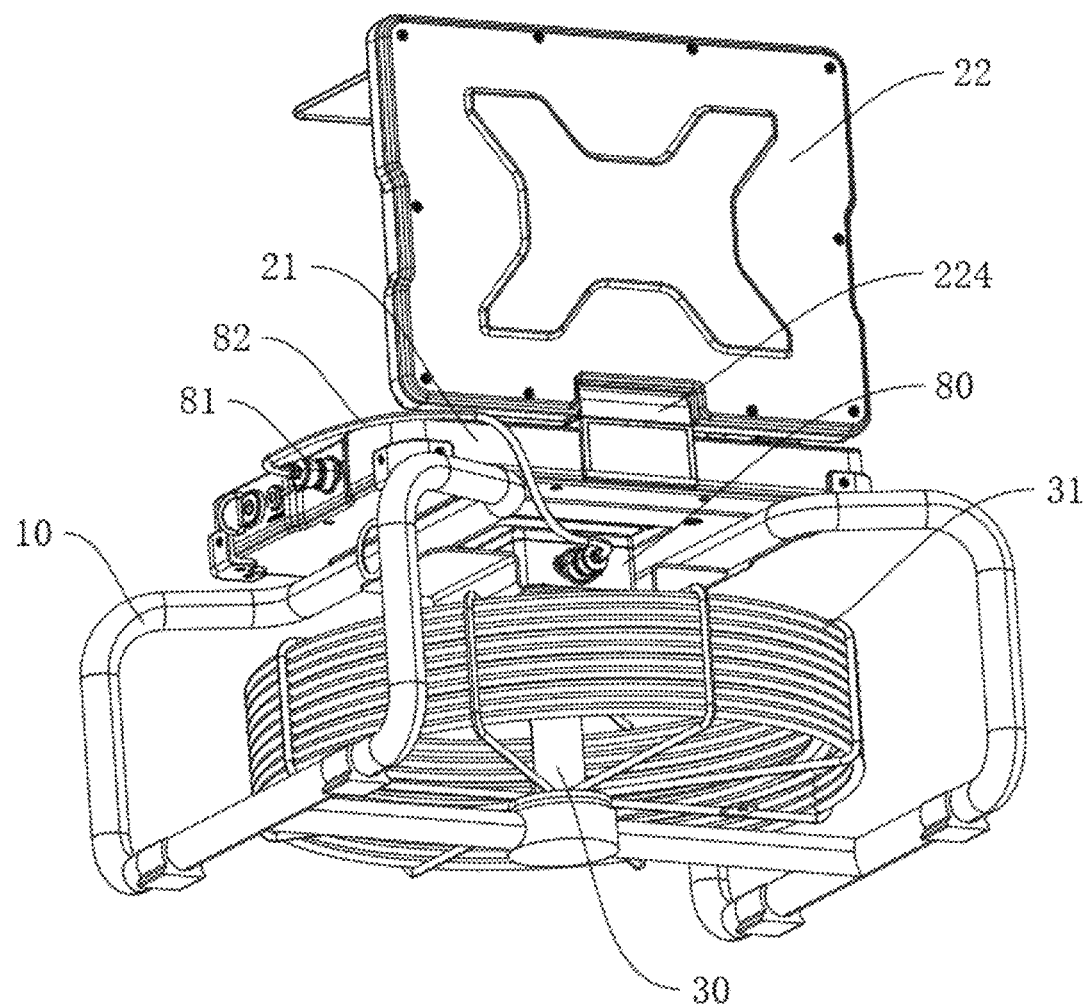
FIG. 2 is an exposed view according to the present embodiment in another angle of view.
Figure 3:
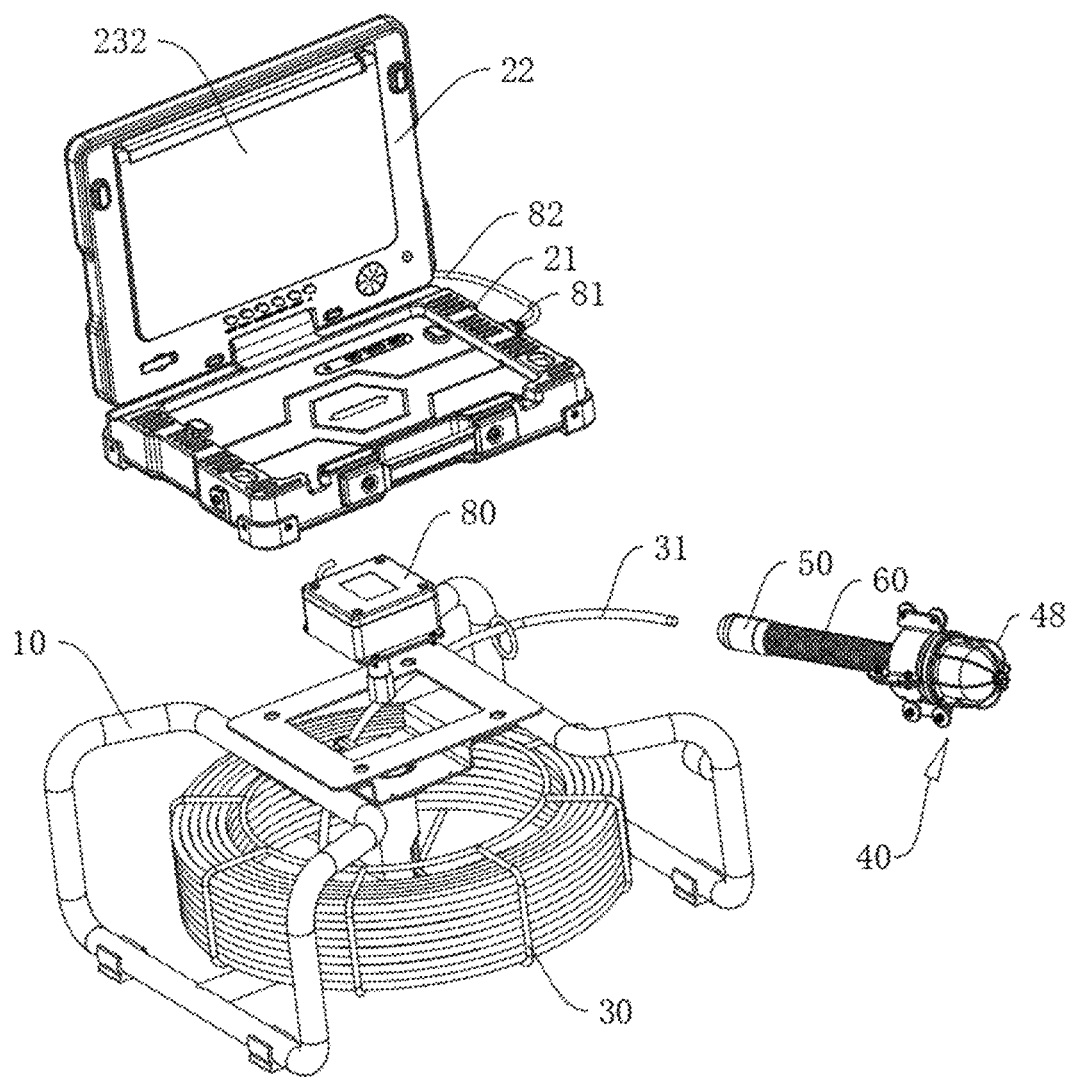
FIG. 3 is a local exploded view according to the present embodiment.
Figure 4:
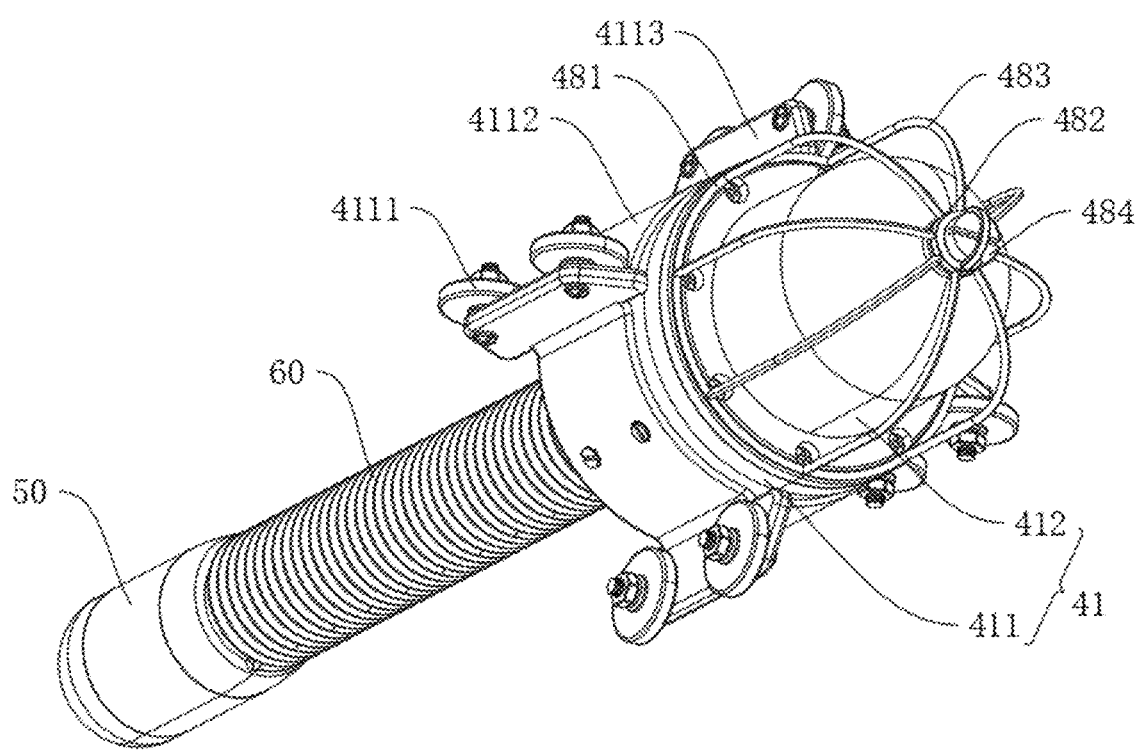
FIG. 4 is an enlarged view of a camera assembly, a spring, and a connecting base according to the present embodiment.
Figure 5:
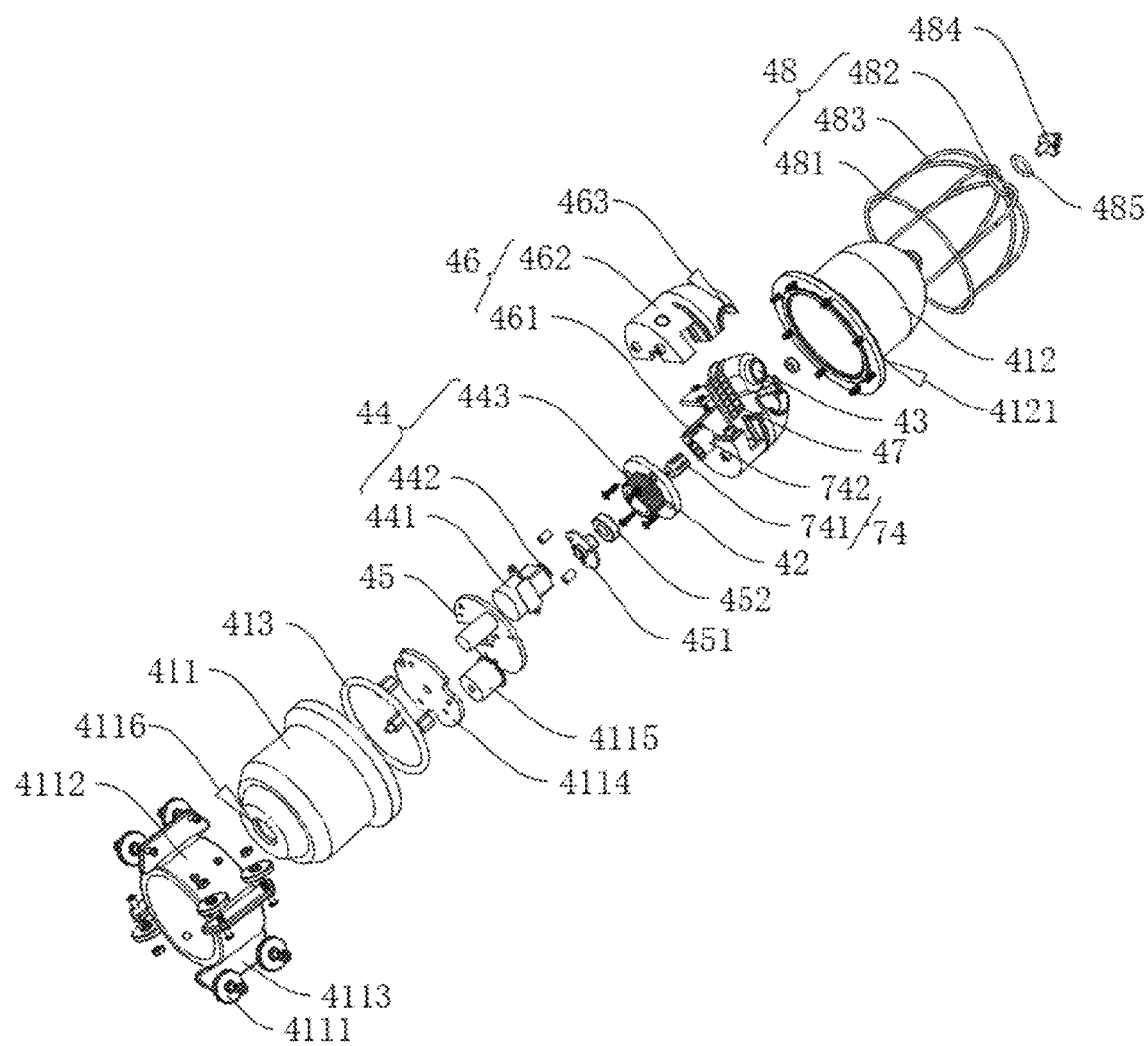
FIG. 5 is an exploded view of the camera assembly according to the present embodiment.
Figure 6:
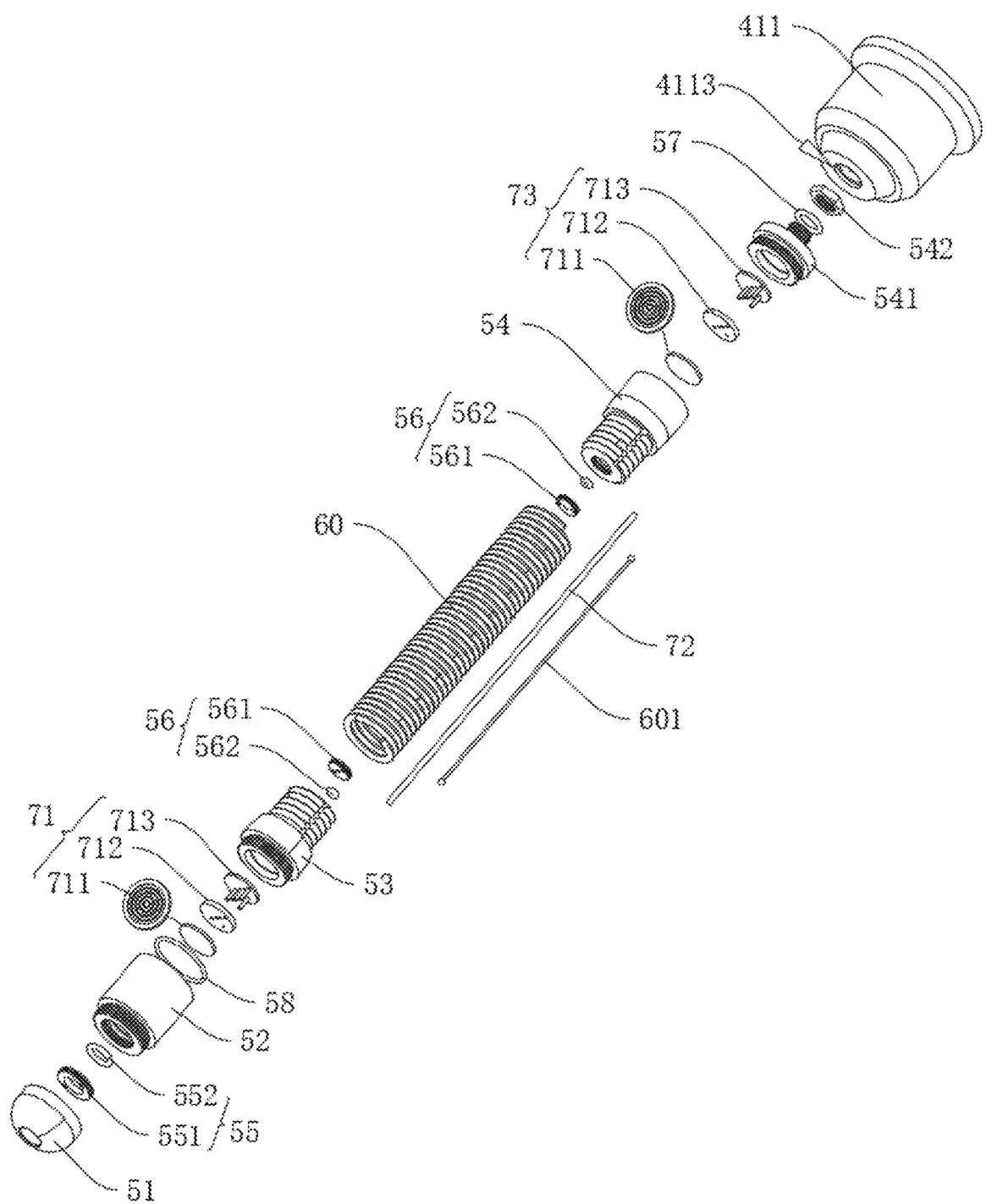
FIG. 6 is an exploded view reflecting assembling relations among the connecting base, the spring, and a bottom mounting shell according to the present embodiment.
Figure 7:
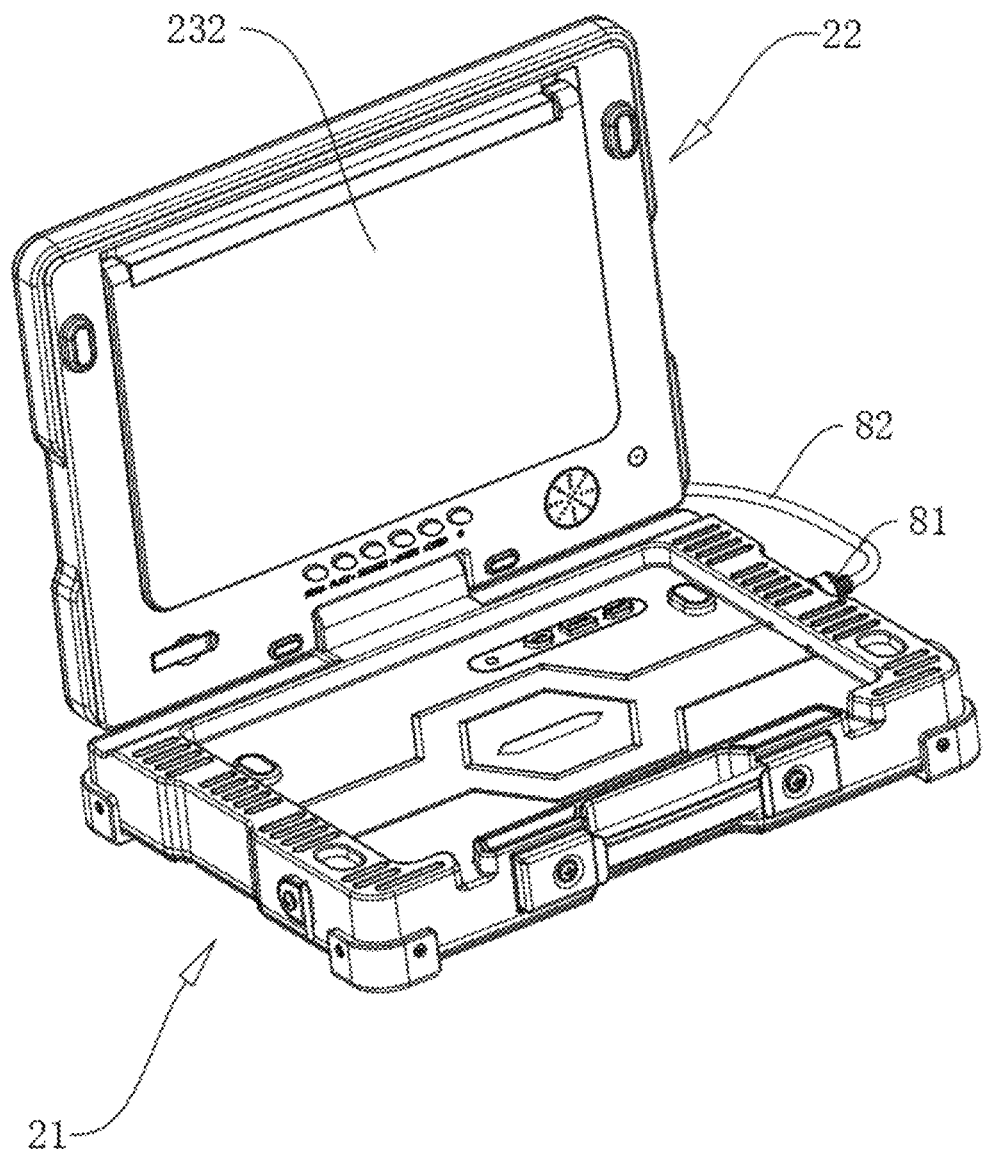
FIG. 7 is an exposed view of a host according to the present embodiment.
Figure 8:
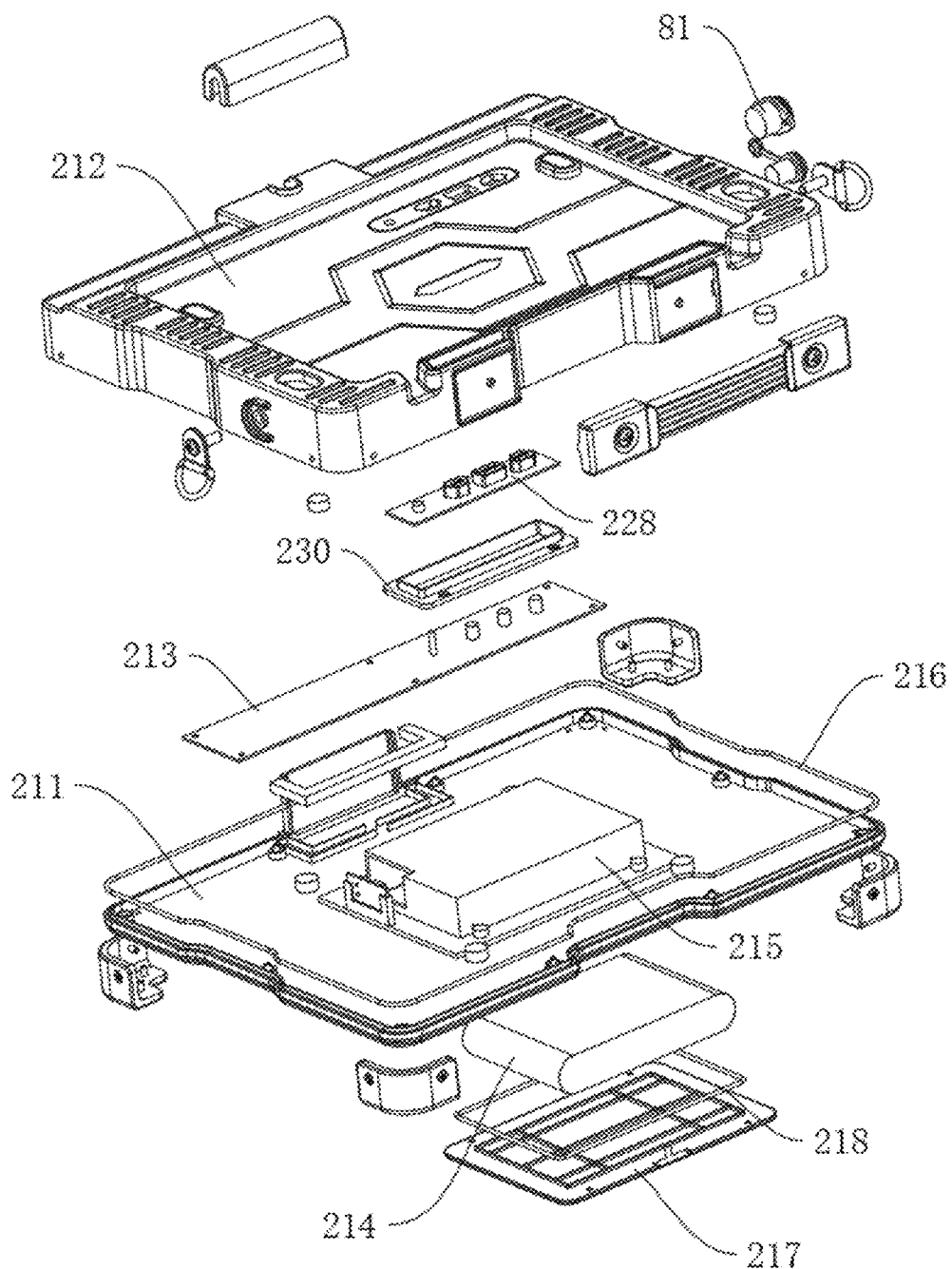
FIG. 8 is an exploded view of the host body according to the present embodiment.
Figure 9:
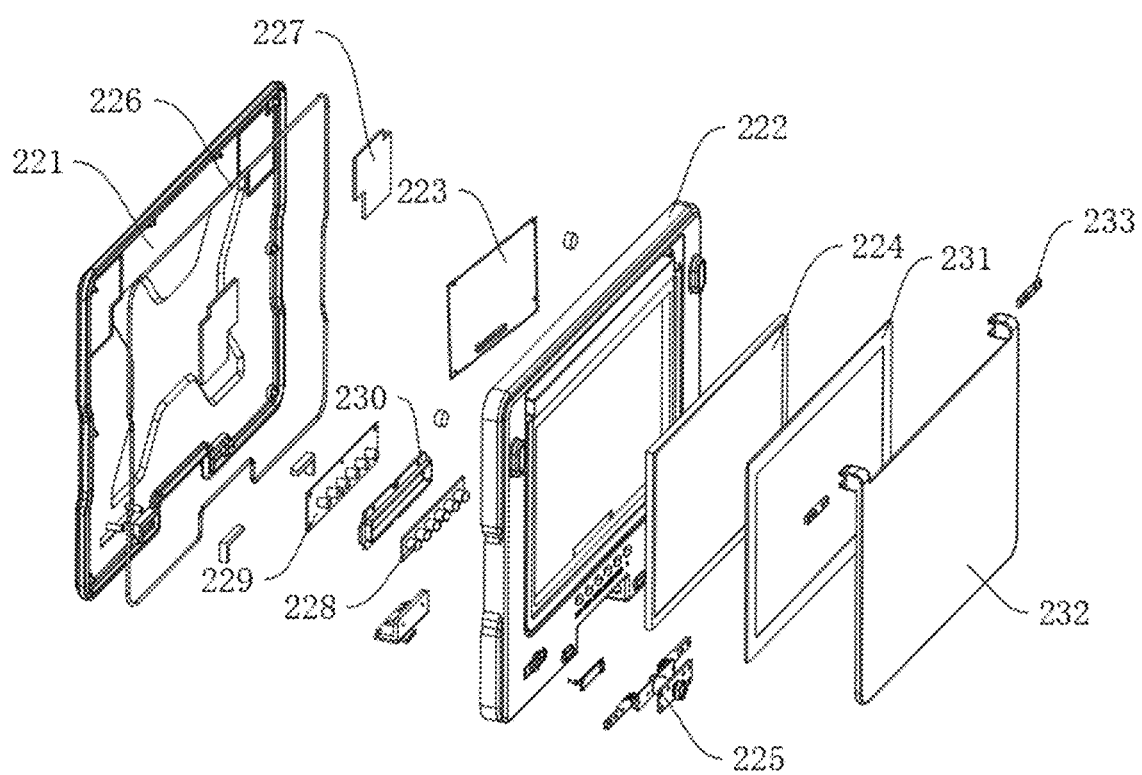
FIG. 9 is an exploded view of a display assembly in the host according to the present embodiment.

The following clearly and completely describes the technical solutions in the embodiments of the invention with reference to the FIGS. 1-9 in the embodiments of the invention patent. Apparently, the described embodiments are some but not all of the embodiments of the invention. Based on the embodiments of the present invention, all other embodiments obtained by those skilled in the art without creative labor shall fall within the protection scope of the present invention.

It should be noted that if the embodiments of the invention involve directional indications (such as up, down, left, right, front, back, . . . ), the directional indications are only used to explain a relative position relationship and movement among various components under a specific posture (as shown in the drawings). If the specific posture changes, the directional indication also changes accordingly.

In addition, if there are descriptions of "first", "second" and the like in the embodiments of the invention, the descriptions of "first", "second" and the like are only intended for description, and shall not be understood as an indication or implication of relative importance or implicit indication of a quantity of indicated technical features. Therefore, the features defined with "first" and "second" may explicitly or implicitly include at least one of the features. In addition, the meaning of "and/or" in the whole text is to include three parallel schemes. Taking "A and/or B" as an example, "A and/or B" includes scheme A, scheme B, or a scheme that A and B are satisfied at the same time. In addition, the technical solutions in the embodiments may be combined with each other on the premise that they may be achieved by persons of ordinary skills in the art. When a combination of technical solutions is contradictory or cannot be achieved, it should be considered that such combination of technical solutions does not exist and also does not fall within the protection scope of the invention.

The present application relates to a pipeline detector, with reference to FIGS. 1-9, the pipeline detector includes a mounting rack 10, a host 20 fixedly disposed on the mounting rack 10, and a wire coil 30 rotatably disposed inside the mounting rack 10. The wire coil 30 is enwound by a cable 31; one end of the cable 31 is electrically connected to the host 20, and another end of the cable 31 is connected with a camera assembly 40. The camera assembly 40 includes a mounting shell 41, a mounting base 42 rotatably disposed inside the mounting shell 41, a camera 43 fixedly disposed on the mounting base 42, and a driving device 44 for driving the mounting base 42 for rotation. The driving device 44 includes a driving motor 441 fixedly disposed inside the mounting shell 41, a driving gear 442 sleeved on an output shaft of the driving motor 441, and a driven gear 443 that is fixedly disposed on one side of the mounting base 42 deviating from the camera 43 and is engaged with the driving gear 442. The cable 31 is electrically connected to the camera 43; and an extension direction of the camera 43 is disposed in an inclined way relative to a direction of a rotation axis of the mounting base 42.

Specifically, the rotation of the mounting shell 41 and the mounting base 42 in the camera assembly 40 is achieved via the driving device 44; the driving gear 442 is driven by the driving motor 441 to rotate, and the driven gear 443 is then driven by the driving gear 442 such that the mounting base 42 and the camera 43 are driven for rotation. The extension direction of the camera 43 is disposed in an inclined way relative to the rotation axis of the mounting base 42 such that the camera 43 may be flexibly adjusted in different directions to cover more detection areas.

Furthermore, the mounting shell 41 is internally and fixedly provided with a fixing base 45 disposed relative to the mounting base 42; a bearing base 451 and a bearing 452 are disposed on one side of the fixing base 45 facing to the mounting base 42; the bearing base 451 is fixed on the fixing base 45; and the bearing 452 is sleeved into the driven gear 443 and sleeved on the bearing base 451.

The mounting shell 41 is internally provided with the fixing base 45 and the bearing base 451, and is in rotational connection with the driven gear 443 via the bearing 452. Such a configuration may effectively improve the rotation flexibility and stability of the camera assembly 40 such that the camera 43 may achieve all-round and dead zone-free detection in complicated pipeline environment to improve detection accuracy and reliability.

Furthermore, the mounting base 42 is provided with a camera shell 46 on which a shooting port 463 adapted to an shooting end of the camera 43 is disposed; and the shooting end of the camera 43 is located inside the shooting port 463.

In the present application, the design of the camera shell 46 serves to protect the camera 43. In the meantime, the camera shell 46 is provided with an adapted shooting port 463 such that the camera 43 may achieve smooth shooting. Specifically, the camera shell 46 is provided with a shooting port 463 which is adapted to the shooting end of the camera 43, thereby ensuring that the shooting end of the camera 43 may achieve photographing via the shooting port 463. The shooting end of the camera 43 is located inside the shooting port 463. Such a design may not only protect the camera 43 from being affected by the external environment, but also may ensure the shooting stability and definition of the camera 43.

In a detailed embodiment, the camera shell 46 includes a camera bottom shell 461 and a camera face shell 462 buckled mutually, and both are fixedly connected via screws or buckling.

Furthermore, the camera shell 46 is internally provided with a lamp panel 47 that emits light towards a shooting direction of the camera 43.

The camera shell 46 is internally provided with a lamp panel 47 such that the present application may effectively solve the problem of inadequate light of the camera 43 in the inner part of pipelines; the images captured by the camera 43 are clearer, thus improving the detection effect and accuracy of pipelines.

Furthermore, the mounting shell 41 includes a bottom mounting shell 411 and a mounting face shell 412 buckled mutually; the driving device 44 and the camera 43 are located inside the bottom mounting shell 411 and the mounting face shell 412, respectively.

The mounting shell 41 is divided into the bottom mounting shell 411 and the mounting face shell 412 such that the driving device 44 and the camera 43 are accommodated in different shells, separately. Such a structure design facilitates the assembly and maintenance of equipment, and meanwhile, may also ensure the independence of each component, thus reducing disturbance. For example, heat or vibration generated by the driving device 44 will not directly affect the performance of the camera 43, and may also solve the problem of difficult maintenance of equipment caused by excessively high component integration.

Moreover, the buckle structure of the bottom mounting shell 411 and the mounting face shell 412 may be achieved via mechanical connection, ensuring the overall stability of equipment. There are a variety of detailed embodiments of the bottom mounting shell 411 and the mounting face shell 412 available. For example, the bottom mounting shell 411 and the mounting face shell 412 may be buckled via buckles, threaded connection, or other mechanical fixation ways.

Furthermore, a waterproof seal ring 413 is disposed between the bottom mounting shell 411 and the mounting face shell 412. Specifically, a sealing groove is disposed on the bottom mounting shell 411 or the mounting face shell 412, and is internally provided with a waterproof seal ring 413. When the bottom mounting shell 411 and the mounting face shell 412 are buckled together, the sealing groove is matched with the waterproof seal ring 413 to achieve the waterproof sealing between the bottom mounting shell 411 and the mounting face shell 412.

The objective of the technical solution is to solve the problem of deficient water resistance of the camera 43 under complicated environment in the prior art. The sealing groove is disposed on the bottom mounting shell 411 or the mounting face shell 412, and is internally provided with a waterproof seal ring 413. When the bottom mounting shell 411 and the mounting face shell 412 are buckled together, the sealing groove may be in tight fit with the waterproof seal ring 413 to achieve the waterproof sealing between the bottom mounting shell 411 and the mounting face shell 412. The advantages of such a design are to effectively prevent moisture from entering into the camera 43, keep normal operation of the internal electronic components, and to prolong the service life of equipment.

Furthermore, a collision guardrail 48 is disposed on an outer hood of the mounting face shell 412.

The collision guardrail 48 may effectively protect the mounting face shell 412 and its inner components from being damaged by collision or other external forces in use procedure, thereby adapting to complicated pipeline environment better and improving the service life and performance stability of the pipeline detector.

In a detailed embodiment, the collision guardrail 48 includes an anti-collision bottom ring 481, an anti-collision face ring 482 disposed coaxially with the anti-collision bottom ring 481, and a plurality of anti-collision rib strips 483 evenly distributed between the anti-collision bottom ring 481 and the anti-collision face ring 482. The mounting face shell 412 is provided with a bottom ring mounting groove 4121 adapted to the anti-collision bottom ring 481; the anti-collision bottom ring 481 has a size greater than a size of the anti-collision face ring 482. One end of each of the anti-collision rib strips 483 is fixedly connected to the anti-collision bottom ring 481, and another end of each of the anti-collision rib strips 483 extends onto the anti-collision face ring 482 in an arc-shaped way.

The anti-collision bottom ring 481 and the anti-collision face ring 482 of the collision guardrail 48 are configured coaxially, and the anti-collision rib strips 483 are evenly distributed between the two components, so as to ensure the overall strength of the collision guardrail 48. The anti-collision bottom ring 481 has a size greater than that of the anti-collision face ring 482 such that the collision guardrail 48 may disperse the impact force upon impact better, to protect the interior mounting shell 41.

In addition, to achieve the stable connection between the collision guardrail 48 and mounting shell 41, a quick release screw 484 is disposed between the mounting face shell 412 and the collision guardrail 48; a screw slot in threaded fit with the quick release screw 484 is disposed on one end of the mounting face shell 412 away from the bottom mounting shell 411. The quick release screw 484 is in threaded connection into the screw slot after passing through the anti-collision bottom ring 481. Moreover, an anti-loose silicone gasket 485 is further disposed between the quick release screw 484 and the anti-collision bottom ring 481.

Furthermore, a plurality of rollers 4111 are disposed outside the bottom mounting shell 411.

The rollers 4111 are configured such that the mounting shell 41 moves inside pipelines more smoothly to reduce the frictional force of the camera assembly 40 during moving in pipelines; and the camera assembly 40 may move inside pipelines more flexibly to be adapted to different pipeline environments, thereby improving the detection efficiency.

In a detailed embodiment, a camera protective casing 4112 is sleeved outside the bottom mounting shell 411 and is provided with a plurality of ribbed plates 4113 that are arranged at intervals along a circumferential direction of the camera protective casing, and at least one of the rollers 4111 is disposed on each of the ribbed plates 4113.

The camera protective casing 4112 and the ribbed plates 4113 are configured, and the rollers 4111 are disposed on the ribbed plates 4113. Such a configuration improves the moving performance of the camera assembly 40, enhances the durability and stability of the camera assembly 40, and effectively reduces the friction and resistance during the detection of pipelines, thereby solving the following problem, i.e., the movement of the camera assembly 40 is limited inside pipelines, thus making the detection process smoother and more efficient.

Furthermore, the bottom mounting shell 411 is further internally provided with a motor circuit board 4114 for controlling the driving motor 441 to work and a position sensor 4115; the motor circuit board 4114 and the position sensor 4115 are each electrically connected to the host 20; and the position sensor 4115 is configured to real-timely monitor location information of the camera assembly 40 and feed back the information to the host 20.

The motor circuit board 4114 and the position sensor 4115 are configured such that the host 20 may stably control the driving motor 441 to work, thus achieving the adjustment of the shooting angles of the camera 43. Meanwhile, the position sensor 4115 real-timely transfers the location information of the camera 43 to the host 20, thus achieving the accurate transmission and records of the detection position of the camera 43, which facilitates the next targeted maintenance and improves the detection efficiency.

Furthermore, a connecting base 50 is disposed at one end of the cable 31 away from the host 20; a spring 60 is disposed between the connecting base 50 and the bottom mounting shell 411; and both ends of the spring 60 are fixedly connected to the connecting base 50 and the bottom mounting shell 411, respectively.

It is appreciable that the spring 60 is elastically connected to the bottom mounting shell 411, which is helpful to relieve the possible impact and vibration of the camera assembly 40 during moving in pipelines, thereby effectively protecting the camera assembly 40 and the cable 31, and prolonging the service life of equipment. In the meantime, the use of the spring 60 may further reduce the frictional force of the camera assembly 40 during moving in pipelines to a certain extent, thus achieving smoother movement.

Furthermore, the connecting base 50 includes a tail cover 51, a middle connecting base 52, and a lower connecting base 53 that are disposed in sequence towards the mounting shell 41 from the cable 31. An upper connecting base 54 is disposed on one side of the bottom mounting shell 411 deviating from the mounting face shell 412; and both ends of the spring 60 are fixedly connected to the lower connecting base 53 and the upper connecting base 54, respectively.

The aforesaid technical solution ensures more stable connection between the cable 31 and the camera assembly 40. Meanwhile, the configuration of the spring 60 also achieves elastic connection to a certain extent, which may effectively buffer the vibration and impact caused by an external force to keep the stability and safety of the camera assembly 40.

In a preferred embodiment, the spring 60 is internally provided with an anti-tension steel wire 601 to enhance the resistance to tension of the spring 60, thus making the spring 60 capable of bearing stronger tensile force and less liable to deformation.

Furthermore, the pipeline detector provided by the present application further includes an electrical connection mechanism. The electrical connection mechanism includes a first electric connector 71 disposed inside the middle connecting base 52, a five-core connecting wire 72 disposed inside the spring 60, a second electric connector 73 disposed inside the upper connecting base 54, and a third electric connector 74 disposed inside the mounting shell 41. One end of the cable 31 away from the host 20 is electrically connected to the first electric connector 71 after penetrating into the tail cover 51; both ends of the five-core connecting wire 72 are electrically connected to the first electric connector 71 and the second electric connector 73, respectively. The second electric connector 73 is electrically connected to the motor circuit board 4114; and both ends of the third electric connector 74 are electrically connected to the motor circuit board 4114 and the camera 43, respectively.

The coupling among the first electric connector 71, the five-core connecting wire 72, the second electric connector 73, and the third electric connector 74 achieves the electric connection among the host 20 with the motor circuit board 4114, and the camera 43 such that the real-time monitoring images captured by the camera 43 may be transmitted to the host 20 and displayed clearly. Meanwhile, the motor circuit board 4114 is controlled by the host 20 to control the rotation of the driving motor 441, thus real-timely adjusting the shooting angles of the camera 43 and improving the detection accuracy and reliability.

Furthermore, the first electric connector 71 and the second electric connector 73 each include a five-core connecting plate 711, an ejector guide plate 712, and an ejector plate 713 that are disposed in sequence along a length direction of the cable 31. The cable 31 is electrically connected to the five-core connecting plate 711 of the first electric connector 71; both ends of the five-core connecting wire 72 are electrically connected to the ejector plate 713 of the first electric connector 71 and the five-core connecting plate 711 of the second electric connector 73, respectively; and the ejector plate 713 of the second electric connector 73 is electrically connected to the motor circuit board 4114.

The third electric connector 74 includes a conductive slip ring 741 disposed on the mounting base 42 and a sliding sleeve 742 disposed on the camera shell 46; the conductive slip ring 741 is in slip fit to the sliding sleeve 742; and both ends of the conductive slip ring 741 are electrically connected to the camera 43 and the motor circuit board 4114, respectively.

In a preferred embodiment, a plurality of bulged edges are disposed on an outer surface of the conductive slip ring 741 along its length direction, and the inner side of the sliding sleeve 742 is provided with grooves in slip fit to the bulged edges. The bulged edges and the grooves are matched such that the camera shell 46 may be rotated stably relative to the mounting base 42 during the electrical connection between the camera 43 and the motor circuit board 4114, thus effectively avoiding wire winding.

An electrical transmission path from the host 20 to the cable 31, from the cable 31 to the five-core connecting wire 72, from the five-core connecting wire 72 to the motor circuit board 4114, and from the motor circuit board 4114 to the camera 43 is formed via the coupling among the five-core connecting plate 711, the ejector guide plate 712, the ejector plate 713, the five-core connecting wire 72, the conductive slip ring 741, and the conductive sliding sleeve 742. Such a configuration ensures the stable transmission of electric current of the camera 43 such that the camera 43 may achieve stable detection in complicated pipelines to avoid electrical transmission failure that could lead to the failure of the camera 43.

Moreover, it needs to be indicated that in other embodiments, the five-core connecting plate 711 and the five-core connecting wire 72 may be also six-core or other number of cores of connecting plates and connecting wires, which will not be further limited hereby.

Furthermore, a first waterproof member 55 is disposed between the tail cover 51 and the middle connecting base 52; the first waterproof member 55 includes a first waterproof pressing plate 551 and a first waterproof ring 552 that are disposed between the tail cover 51 and the middle connecting base 52 in sequence. The cable 31 is fixedly connected onto the five-core connecting plate 711 of the first electric connector 71 after passing through the first waterproof pressing plate 551 and the first waterproof ring 552, respectively. Moreover, gaps between the cable 31 and the tail cover 51 are blocked via the coupling of the first waterproof ring 552 and the first waterproof pressing plate 551.

The gaps between the cable 31 and the tail cover 51 are blocked via the first waterproof member 55 formed via the coupling of the first waterproof ring 552 and the first waterproof pressing plate 551 such that water from the outside is not prone to flow into the middle connecting base 52 from the gaps between the cable 31 and the tail cover 51 to damage the internal first electric connector 71. Such a configuration improves the water resistance between the tail cover 51 and the cable 31, i.e., water resistance of the overall equipment is enhanced and the service life of equipment is prolonged.

Furthermore, the upper connecting base 54 and the lower connecting base 53 are each internally provided with a second waterproof member 56; the two second waterproof members 56 each include a second waterproof pressing plate 561 and a second waterproof ring 562. Both ends of the five-core connecting wire 72 are connected to the ejector plate 713 of the first electric connector 71 and the five-core connecting plate 711 of the second electric connector 73, respectively after passing through the second waterproof pressing plate 561 and the second waterproof ring 562.

Joint parts of the spring 60 with the upper connecting base 54 and the lower connecting base 53 are blocked via the two second waterproof members 56 such that moisture inside the pipeline is hard to enter into the lower connecting base 53 and the upper connecting base 54 via the joint parts, thereby further improving the water resistance of the overall equipment.

Furthermore, the bottom mounting shell 411 is provided with an intercommunicating hole 4116 communicated with the inner part of the mounting shell 41. A coupling nut 541 is disposed on one side of the upper connecting base 54 deviating from the spring 60; one end of the coupling nut 541 deviating from the upper connecting base 54 stretches into the intercommunicating hole 4116; and a fixing nut 542 is disposed on one end of the coupling nut 541 stretching into the intercommunicating hole 4116. A third waterproof ring 57 for blocking a gap of a circumferential bottom shell between the coupling nut 541 and the intercommunicating hole 4116 is further disposed between the coupling nut 541 and the fixing nut 542.

The aforesaid technical solution ensures the connection stability between the upper connecting base 54 and the bottom mounting shell 411, and also improves the water resistance therebetween. That is, the technical solution avoids that moisture enters into the inner part of the mounting shell 41 via the joint parts of the upper connecting base 54 and the bottom mounting shell 411 in humid or underwater environment, to damage the internal electronic components.

Furthermore, the middle connecting base 52 and the lower connecting base 53 are tightened via threads, and a fourth waterproof ring 58 is disposed between the middle connecting base 52 and the lower connecting base 53.

The fourth waterproof ring 58 is configured such that moisture is hard to enter into equipment via the gap between the middle connecting base 52 and the lower connecting base 53, thus further improving the water resistance of equipment.

In general, the water resistance of equipment is greatly enhanced via the multi-waterproof structure consisting of the first waterproof member 55 (the first waterproof pressing plate 551 and the first waterproof ring 552), two second waterproof members 56 (the second waterproof pressing plate 561 and the second waterproof ring 562), the third waterproof ring 57, and the fourth waterproof ring 58. Such a configuration avoids that when a pipeline detector works in humid or underwater environment, its internal electronic components are corroded by moisture to cause the failure of the pipeline detector. Compared to the existing pipeline detectors, the pipeline detector put forward in the present application may be adapted to harsher environment and thus, has a wider range of application and is more competitive.

Furthermore, the pipeline detector further includes a waterproof meter counter 80 disposed between the mounting rack 10 and the host 20. The waterproof meter counter 80 is configured to detect the pay-off length of the cable 31 on the wire coil 30; both the waterproof meter counter 80 and the host 20 are all provided with a waterproof aviation plug 81. The electrical transmission between the waterproof meter counter 80 and the host 20 is achieved via a signal wire 82. Moreover, both ends of the signal wire 82 are connected to the waterproof aviation plugs 81 on the waterproof meter counter 80 and the host 20, respectively.

The waterproof meter counter 80 is configured to detect the pay-off length of the cable 31 on the wire coil 30 to ensure the positioning precision of the camera assembly 40. The waterproof aviation plugs 81 are configured such that more stable signal transmission is achieved between the waterproof meter counter 80 and the host 20, thus avoiding unstable signal transmission between the waterproof meter counter 80 and the host 20 due to the influence of moisture in humid working environment.

Furthermore, the host 20 includes a host body 21 fixedly mounted above the waterproof meter counter 80 and a display screen assembly 22 rotatably disposed on the host body 21. The host body 21 includes a bottom host shell 211 and a host face shell 212 buckled mutually as well as a main control circuit board 213 and a battery 214 that are disposed inside the bottom host shell 211. A first waterproof cotton strip 216 is disposed between the bottom host shell 211 and the host face shell 212, and is disposed along a circumferential direction of the bottom host shell 211 and the host face shell 212. A battery holder 215 for accommodating the battery 214 is disposed on one side of the bottom host shell 211 deviating from the face shell; the bottom host shell 211 is detachably mounted with a battery cover 217 for sealing the battery holder 215; and a second waterproof cotton strip 218 is disposed on one side of the battery cover 217 towards the battery holder 215.

The display screen assembly 22 includes a display bottom shell 221 and a display face shell 222 coupled mutually, a display circuit board 223 disposed on the display face shell 222, and a display screen 224 disposed on the display face shell 222. The display face shell 222 is rotatably disposed on the host body 21 via the rotating shafts 225 in front, back, left, and right directions such that the display screen assembly 22 may rotate in front, back, left, and right directions relative to the host body 21. A third waterproof cotton strip 226 and waterproof EVA members 227 are disposed between the display bottom shell 221 and the display face shell 222; the third waterproof cotton strip 226 is disposed along a circumferential direction of the display bottom shell 221 and the display face shell 222; and there are at least two waterproof EVA members 227. Moreover, the two waterproof EVA members 227 are symmetrically disposed at both sides of the upper part of the display bottom shell 221 and the display face shell 222, respectively.

It is appreciable that the configuration of the first waterproof cotton strip 216, the second waterproof cotton strip 218, the third waterproof cotton strip 226, and the waterproof EVA members 227 greatly improves the water resistance of the overall host 20. By such a configuration, the host 20 is not prone to be corroded by moisture when used in humid environment, thus ensuring the stability of the pipeline detector and prolonging the service life.

Moreover, it needs to be indicated that both the host body 20 and the display screen assembly 22 include a silicone keypad 228 and a keypad circuit board 229. Correspondingly, the host body 20 and the display screen assembly 22 further include a keypad waterproof pressing plate 230 matched with the silicone keypad 228, thereby further enhancing the water resistance of the host 20.

Furthermore, the display screen assembly 22 further includes an acrylic transparent board 231 that is fixedly disposed on the display face shell 222 and configured to protect the display screen 224, and a sun shield 232 rotatably disposed on the display face shell 222. Both sides of the sun shield 232 are rotatably connected onto the display face shell 222 via a damping rotating shaft 233, so as to achieve the locking of the rotation angle of the sun shield 232.

The acrylic transparent board 231 is configured such that the display screen 224 may be protected to keep the display from being damaged in use procedure. The sun shield 232 is matched with the damping rotating shaft 233 such that the sun shield 232 may be rotated to any angle and kept stable relative to the display face shell 222. Hence, such a configuration avoids that the display screen 224 is hardly seen by technicians clearly under the environment of direct sunlight, which is user-friendly and brings good usage experience.

What is described above are merely used to specify the technical solutions of the present invention but are not construed as limiting. Other amendments or equivalent replacements made by those skilled in the art to the technical solutions of the present invention shall all fall within the scope of the claims of the present invention as long as these amendments or equivalent replacements are free of departing from the spirit and scope of the technical solutions of the present invention.

What is claimed is:

1. A pipeline detector, comprising a mounting rack (10), a host (20) fixedly disposed on the mounting rack (10), and a wire coil (30) disposed inside the mounting rack (10), wherein the wire coil (30) is enwound by a cable (31); one end of the cable (31) is electrically connected to the host (20), and another end of the cable (31) is connected with a camera assembly (40); the camera assembly (40) comprises a mounting shell (41), a mounting base (42) rotatably disposed inside the mounting shell (41), a camera (43) fixedly disposed on the mounting base (42), and a driving device (44) for driving the mounting base (42) for rotation; the driving device (44) comprises a driving motor (441) fixedly disposed inside the mounting shell (41), a driving gear (442) sleeved on an output shaft of the driving motor (441), and a driven gear (443) that is fixedly disposed on one side of the mounting base (42) deviating from the camera (43) and is engaged with the driving gear (442); the cable (31) is electrically connected to the camera (43); and a direction of optical axis of the camera (43) is disposed in an inclined way relative to a direction of a rotation axis of the mounting base (42).

2. The pipeline detector according to claim 1, wherein the mounting shell (41) is internally and fixedly provided with a fixing base (45) disposed relative to the mounting base (42); a bearing base (451) and a bearing (452) are disposed on one side of the fixing base (45) facing to the mounting base (42); the bearing base (451) is fixed on the fixing base (45); and the bearing (452) is disposed inside the driven gear (443) and sleeved on the bearing base (451).

3. The pipeline detector according to claim 2, wherein the camera shell (46) is internally provided with a lamp panel (47) that emits light towards a shooting direction of the camera (43).

4. The pipeline detector according to claim 3, wherein the bottom mounting shell (411) is further internally provided with a motor circuit board (4114) for controlling the driving motor (441) to work and a position sensor (4115); the motor circuit board (4114) and the position sensor (4115) are each electrically connected to the host (20); and the position sensor (4115) is configured to real-timely monitor location information of the camera (43) and feed back the information to the host (20).

5. The pipeline detector according to claim 4, wherein a connecting base (50) is disposed at one end of the cable (31) away from the host (20); a spring (60) is disposed between the connecting base (50) and the bottom mounting shell (411); and both ends of the spring (60) are fixedly connected to the connecting base (50) and the bottom mounting shell (411), respectively.

6. The pipeline detector according to claim 5, wherein the connecting base (50) comprises a tail cover (51), a middle connecting base (52), and a lower connecting base (53) that are disposed in sequence towards the mounting shell (41) from the cable (31); an upper connecting base (54) is disposed on one side of the bottom mounting shell (411) deviating from the mounting face shell (412); and both ends of the spring (60) are fixedly connected to the lower connecting base (53) and the upper connecting base (54), respectively.

7. The pipeline detector according to claim 6, wherein the pipeline detector further comprises an electrical connection mechanism comprising a first electric connector (71) disposed inside the middle connecting base (52), a five-core connecting wire (72) disposed inside the spring (60), a second electric connector (73) disposed inside the upper connecting base (54), and a third electric connector (74) disposed inside the mounting shell (41); one end of the cable (31) away from the host (20) is electrically connected to the first electric connector (71) after penetrating into the tail cover (51); both ends of the five-core connecting wire (72) are electrically connected to the first electric connector (71) and the second electric connector (73), respectively; the second electric connector (73) is electrically connected to the motor circuit board (4114); and both ends of the third electric connector (74) are electrically connected to the motor circuit board (4114) and the camera (43), respectively.

8. The pipeline detector according to claim 7, wherein the first electric connector (71) and the second electric connector (73) each comprise a five-core connecting plate (711), an ejector guide plate (712), and an ejector plate (713) that are disposed in sequence along a length direction of the cable (31); the cable (31) is electrically connected to the five-core connecting plate (711) of the first electric connector (71); both ends of the five-core connecting wire (72) are electrically connected to the ejector plate (713) of the first electric connector (71) and the five-core connecting plate (711) of the second electric connector (73), respectively; and the ejector plate (713) of the second electric connector (73) is electrically connected to the motor circuit board (4114).

9. The pipeline detector according to claim 7, wherein the third electric connector (74) comprises a conductive slip ring (741) disposed on the mounting base (42) and a sliding sleeve (742) disposed on the camera shell (46); the conductive slip ring (741) is in slip fit to the sliding sleeve (742);

and both ends of the conductive slip ring (741) are electrically connected to the camera (43) and the motor circuit board (4114), respectively.

10. The pipeline detector according to claim 6, wherein a first waterproof member (55) is disposed between the tail cover (51) and the middle connecting base (52); the first waterproof member (55) comprises a first waterproof pressing plate (551) and a first waterproof ring (552) that are disposed between the tail cover (51) and the middle connecting base (52) in sequence; and the cable (31) is fixedly connected onto the five-core connecting plate (711) of the first electric connector (71) after passing through the first waterproof pressing plate (551) and the first waterproof ring (552), respectively.

11. The pipeline detector according to claim 10, wherein the upper connecting base (54) and the lower connecting base (53) are each internally provided with a second waterproof member (56); the two second waterproof members (56) each comprise a second waterproof pressing plate (561) and a second waterproof ring (562); and both ends of the five-core connecting wire (72) are connected to the ejector plate (713) of the first electric connector (71) and the five-core connecting plate (711) of the second electric connector (73), respectively after passing through the second waterproof pressing plate (561) and the second waterproof ring (562).

12. The pipeline detector according to claim 11, wherein the bottom mounting shell (411) is provided with an intercommunicating hole (4116) in communication with an inner part of mounting shell (41); a coupling nut (541) is disposed on one side of the upper connecting base (54) deviating from the spring (60); one end of the coupling nut (541) deviating from the upper connecting base (54) stretches into the intercommunicating hole (4116); a fixing nut (542) is disposed on one end of the coupling nut (541) stretching into the intercommunicating hole (4116); and a third waterproof ring (57) for blocking a gap of a circumferential bottom shell between the coupling nut (541) and the intercommunicating hole (4116) is further disposed between the coupling nut (541) and the fixing nut (542).

13. The pipeline detector according to claim 12, wherein a fourth waterproof ring (58) is disposed between the middle connecting base (52) and the lower connecting base (53).

14. The pipeline detector according to claim 1, wherein the mounting base (42) is provided with a camera shell (46) on which a shooting port (463) adapted to a shooting end of the camera (43) is disposed; and the shooting end of the camera (43) is located inside the shooting port (463).

15. The pipeline detector according to claim 1, wherein the mounting shell (41) comprises a bottom mounting shell (411) and a mounting face shell (412) that are buckled mutually; and the driving device (44) and the camera (43) are located inside the bottom mounting shell (411) and the mounting face shell (412), respectively.

16. The pipeline detector according to claim 15, wherein a waterproof seal ring (413) is disposed between the bottom mounting shell (411) and the mounting face shell (412).

17. The pipeline detector according to claim 15, wherein a collision guardrail (48) is disposed on an outer hood of the mounting face shell (412).

18. The pipeline detector according to claim 17, wherein the collision guardrail (48) comprises an anti-collision bottom ring (481), an anti-collision face ring (482) disposed coaxially with the anti-collision bottom ring (481), and a plurality of anti-collision rib strips (483) evenly distributed between the anti-collision bottom ring (481) and the anti-collision face ring (482); the mounting face shell (412) is provided with a bottom ring mounting groove (4121) adapted to the anti-collision bottom ring (481); the anti-collision bottom ring (481) has a size greater than a size of the anti-collision face ring (482); one end of each of the anti-collision rib strips (483) is fixedly connected to the anti-collision bottom ring (481), and another end of each of the anti-collision rib strips (483) extends onto the anti-collision face ring (482) in an arc-shaped way.

19. The pipeline detector according to claim 15, wherein a plurality of rollers (4111) are disposed outside the bottom mounting shell (411).

20. The pipeline detector according to claim 19, wherein a camera protective casing (4112) is sleeved outside the bottom mounting shell (411) and is provided with a plurality of ribbed plates (4113) that are arranged at intervals along a circumferential direction of the camera protective casing (4112), and at least one of the rollers (4111) is disposed on each of the ribbed plates (4113).

* * * * *